US012715944B2

(12) United States Patent
Suzuki et al.

(10) Patent No.: US 12,715,944 B2
(45) **Date of Patent: *Aug. 25, 2026**

(54) MODIFIER FOR OPHTHALMOLOGICAL DEVICE

(71) Applicant: NOF CORPORATION, Tokyo (JP)

(72) Inventors: Hirotaka Suzuki, Kawasaki (JP); Norio Iwakiri, Kawasaki (JP)

(73) Assignee: NOF CORPORATION, Tokyo (JP)

( * ) Notice: Subject to any disclaimer, the term of this patent is extended or adjusted under 35 U.S.C. 154(b) by 622 days.

This patent is subject to a terminal disclaimer.

(21) Appl. No.: 18/039,442

(22) PCT Filed: Nov. 24, 2021

(86) PCT No.: PCT/JP2021/042877

§ 371 (c)(1), (2) Date: May 30, 2023

(87) PCT Pub. No.: WO2022/118697

PCT Pub. Date: Jun. 9, 2022

(65) Prior Publication Data

US 2024/0117094 A1 Apr. 11, 2024

(30) Foreign Application Priority Data

Dec. 1, 2020 (JP) ................................ 2020-199789

(51) Int. Cl.

| | |
|---|---|
| ***C08L 83/04*** | (2006.01) |
| ***C08F 220/36*** | (2006.01) |
| ***G02B 1/04*** | (2006.01) |

(52) U.S. Cl.

CPC ........... *C08F 220/36* (2013.01); *C08L 83/04* (2013.01); *G02B 1/043* (2013.01); *C08F 2800/10* (2013.01); *C08F 2800/20* (2013.01)

(58) Field of Classification Search

None

See application file for complete search history.

(56) References Cited

U.S. PATENT DOCUMENTS

| | | | |
|---|---|---|---|
| 2018/0244911 A1 | 8/2018 | Iso et al. | |
| 2024/0010777 A1 * | 1/2024 | Suzuki .................. | C08F 226/10 |

FOREIGN PATENT DOCUMENTS

| | | |
|---|---|---|
| JP | 5-331395 A | 12/1993 |
| JP | 2007-056220 A | 3/2007 |
| JP | 2007-197513 A | 8/2007 |
| JP | 2011052055 A * | 3/2011 |
| JP | 2016-031255 A | 3/2016 |
| JP | 2017-206441 A | 11/2017 |
| WO | 2017/043500 A1 | 3/2017 |
| WO | 2018/135421 A1 | 7/2018 |

OTHER PUBLICATIONS

Machine translation of JP-2011052055-A (no date).*

International Search Report for PCT/JP2021/042877 dated Feb. 8, 2022 (PCT/ISA/210).

* cited by examiner

*Primary Examiner* — Michael J Feely

(74) *Attorney, Agent, or Firm* — Sughrue Mion, PLLC

(57) ABSTRACT

Provided is a modifier for an ophthalmic device capable of imparting high wettability and lubricity to a silicone hydrogel, specifically, a modifier for an ophthalmic device capable of expressing such effect when contained in a small amount. Also provided are a silicone hydrogel obtained by curing a silicone hydrogel composition containing the modifier for an ophthalmic device, and an ophthalmic device using the silicone hydrogel. It has been found that a water-soluble silicone-containing water-soluble copolymer obtained by copolymerizing a phosphorylcholine group-containing monomer and a specific silicone monomer can impart high wettability and lubricity to a silicone hydrogel when contained in a small amount.

17 Claims, No Drawings

MODIFIER FOR OPHTHALMOLOGICAL DEVICE

CROSS REFERENCE TO RELATED APPLICATIONS

This application is a National Stage of International Application No. PCT/JP2021/042877 filed Nov. 24, 2021, claiming priority based on Japanese Patent Application No. 2020-199789 filed Dec. 1, 2020.

TECHNICAL FIELD

The present invention relates to a modifier for an ophthalmic device containing a silicone-containing water-soluble copolymer, which is optimal for being incorporated into an ophthalmic device, such as a contact lens, an intraocular lens, or an artificial cornea, in production of the device.

The present application claims priority from Japanese Patent Application No. 2020-199789, which is incorporated herein by reference.

BACKGROUND ART

A silicone hydrogel contact lens has markedly high oxygen permeability as compared to a conventional contact lens, and hence has a large amount of oxygen supply to the cornea and can alleviate strain on the ocular tissue. The silicone hydrogel contact lens is becoming a mainstream contact lens prescribed in recent years, and is expected to gain increasingly widespread use in the future.

Meanwhile, the silicone hydrogel lens has a low water content and high hydrophobicity, and hence has had a disadvantage of being liable to repel tears and being liable to have lipid contamination. In addition, in recent years, it has been reported that friction between the eyelid conjunctival margin and the ocular surface at the time of blinking causes epithelial cells of the surface layer of the eyelid conjunctiva to be shed and degenerated (Non Patent Literature 1 and Non Patent Literature 2). Accordingly, it is desired that lubricity as well as hydrophilicity be imparted to the silicone hydrogel lens. For that purpose, various measures have been investigated in order to improve the hydrophilicity and lubricity of the surface of the silicone hydrogel lens.

For example, it is widely performed to incorporate a plasma treatment step of a lens into the production steps of a contact lens. The plasma treatment has an advantage in that relatively high hydrophilicity and durability can be imparted, but has disadvantages in that lubricity cannot be imparted, and that large-scale capital investment is required.

As a method that does not require large-scale capital investment, it is widely performed to produce a lens using a hydrophilic monomer. It is known that, particularly when 2-methacryloyloxyethyl phosphorylcholine (hereinafter sometimes abbreviated as "MPC") having a zwitterionic structure is used, the lens obtains high hydrophilicity and lubricity.

In Patent Literature 1, there is a description of a silicone hydrogel lens obtained from a specific composition that may contain MPC. However, in Patent Literature 1, although an improvement in hydrophilicity of the lens surface is shown through measurement of water break up time, lubricity in the sense of reducing friction on the lens surface is not investigated, and hence there is room for improvement.

In Patent Literature 2, there is a disclosure that a silicone hydrogel lens having satisfactory lubricity as well is obtained by using MPC and other specific monomers at a specific composition ratio. However, MPC needs to be added at 5 wt % or more in order to obtain satisfactory lubricity, and at about 20 wt % in order to obtain the highest lubricity, and certain limitations on lens monomer composition are entailed in compatibilizing MPC at such high concentration with a silicone component having high hydrophobicity.

In view of the foregoing, it has been desired that a technology applicable to a wider range of lens composition be developed.

CITATION LIST

Patent Literature

[PTL 1] JP 2014-89477 A

[PTL 2] WO 2020/054711 A1

Non Patent Literature

[NPL 1] D. R. Korb et al., 2002, CLAO J., 28, 211-126

[NPL 2] D. R. Korb et al., 2005, Eye & Contact Lens, 31, 2-8

SUMMARY OF INVENTION

Technical Problem

An object of the present invention is to provide a modifier for an ophthalmic device capable of imparting high wettability and lubricity to a silicone hydrogel, specifically, a modifier for an ophthalmic device capable of expressing such effect when contained in a small amount. Another object of the present invention is to provide a silicone hydrogel obtained by curing a silicone hydrogel composition containing the modifier for an ophthalmic device, and an ophthalmic device using the silicone hydrogel.

Solution to Problem

The inventors of the present invention have made extensive investigations in view of the above-mentioned objects, and as a result, have surprisingly found that a water-soluble silicone-containing water-soluble copolymer obtained by copolymerizing a phosphorylcholine group-containing monomer and a specific silicone monomer can impart high wettability and lubricity to a silicone hydrogel when contained in a small amount. Thus, the inventors have completed the present invention.

That is, the present invention is as described below.

1. A modifier for an ophthalmic device, including a copolymer containing: a constituent unit based on a hydrophilic monomer "a" represented by the following formula (1); and a constituent unit based on a silicone monomer "b" represented by the following formula (2) or the following formula (3), the copolymer being incapable of dissolving at 1.0% (w/v) in water at 20° C., and capable of dissolving at 0.1% (w/v) or more in boiling water:

(1)

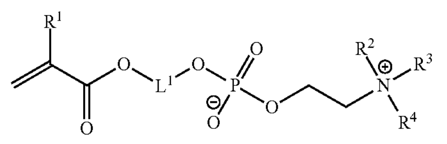

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

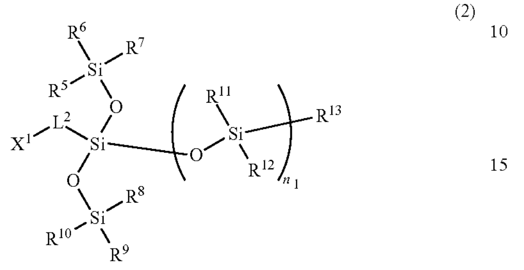

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

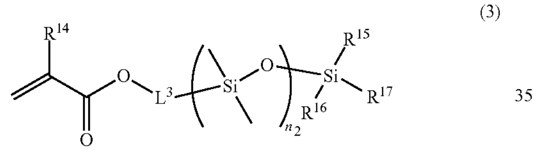

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

2. The modifier for an ophthalmic device according to the above-mentioned item 1, wherein the copolymer further contains a constituent unit based on a thermally reactive monomer or a photoreactive monomer "c".

3. The modifier for an ophthalmic device according to the above-mentioned item 2, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is tris(trimethylsiloxy)silylpropyl methacrylate, polydimethylsiloxane monomethacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or the photoreactive monomer "c" is glycidyl methacrylate, methacryloyloxybenzophenone, or 4-(4-azidobenzoyloxymethyl)vinylbenzene.

4. The modifier for an ophthalmic device according to the above-mentioned item 2, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or the photoreactive monomer "c" is any one selected from the following:

1) 2-methacryloyloxyethyl phosphorylcholine and tris(trimethylsiloxy)silylpropyl methacrylate;
2) 2-methacryloyloxyethyl phosphorylcholine and polydimethylsiloxane monomethacrylate;
3) 2-methacryloyloxyethyl phosphorylcholine and 4-(2-hydroxyethyl)-2-methylene-1-(tris(trimethylsiloxy)silylpropyl)butane-1,4-dioate;
4) 2-methacryloyloxyethyl phosphorylcholine, tris(trimethylsiloxy)silylpropyl methacrylate, and glycidyl methacrylate;
5) 2-methacryloyloxyethyl phosphorylcholine, polydimethylsiloxane monomethacrylate, and glycidyl methacrylate;
6) 2-methacryloyloxyethyl phosphorylcholine, tris(trimethylsiloxy)silylpropyl methacrylate, and methacryloyloxybenzophenone;
7) 2-methacryloyloxyethyl phosphorylcholine, polydimethylsiloxane monomethacrylate, and methacryloyloxybenzophenone;
8) 2-methacryloyloxyethyl phosphorylcholine, 4-(2-hydroxyethyl)-2-methylene-1-(tris(trimethylsiloxy) silylpropyl)butane-1,4-dioate, and 4-(4-azidobenzoyloxymethyl)vinylbenzene; and
9) 2-methacryloyloxyethyl phosphorylcholine, 3-(3-(methylbis(trimethylsiloxy)silyl)propyl)glycerol-1-methacrylate, and methacryloyloxybenzophenone.

5. A silicone hydrogel composition, including: the copolymer of the above-mentioned item 1 or 2; and a base composition, wherein a content of the copolymer is from 0.05 part by mass to 2 parts by mass with respect to 100 parts by mass of the base composition.

6. A silicone hydrogel, which is obtained by curing the silicone hydrogel composition of the above-mentioned item 5.

7. An ophthalmic device, including the silicone hydrogel of the above-mentioned item 6.

8. The ophthalmic device according to the above-mentioned item 7, wherein the ophthalmic device is a soft contact lens.

9. A method of producing a silicone hydrogel, including a step of curing a silicone hydrogel composition containing a copolymer, the copolymer containing: a constituent unit based on a hydrophilic monomer "a" represented by the following formula (1); and a constituent unit based on a silicone monomer "b" represented by the following formula (2) or the following formula (3), the copolymer being incapable of dissolving at 1.0% (w/v) in water at 20° C., and capable of dissolving at 0.1% (w/v) or more in boiling water:

(1)

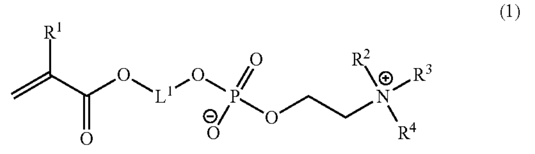

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

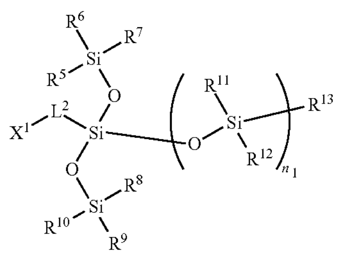

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

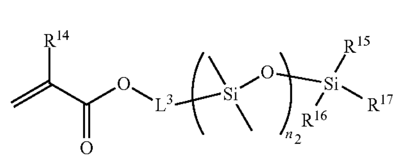

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

10. The method of producing a silicone hydrogel according to the above-mentioned item 9, wherein an amount of the copolymer in the silicone hydrogel composition is from 0.1 part by mass to 1 part by mass.

11. The method of producing a silicone hydrogel according to the above-mentioned item 9, wherein the silicone hydrogel composition further contains a base composition, and a content of the copolymer is from 0.05 part by mass to 2 parts by mass with respect to 100 parts by mass of the base composition.

12. The method of producing a silicone hydrogel according to the above-mentioned item 9, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is tris(trimethylsiloxy)silylpropyl methacrylate, polydimethylsiloxane monomethacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or the photoreactive monomer "c" is glycidyl methacrylate, methacryloyloxybenzophenone, or 4-(4-azidobenzoyloxymethyl) vinylbenzene.

13. The method of producing a silicone hydrogel according to the above-mentioned item 9, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or the photoreactive monomer "c" is any one selected from the following:

1) 2-methacryloyloxyethyl phosphorylcholine and tris(trimethylsiloxy)silylpropyl methacrylate;

2) 2-methacryloyloxyethyl phosphorylcholine and polydimethylsiloxane monomethacrylate;

3) 2-methacryloyloxyethyl phosphorylcholine and 4-(2-hydroxyethyl)-2-methylene-1-(tris(trimethylsiloxy)silylpropyl)butane-1,4-dioate;

4) 2-methacryloyloxyethyl phosphorylcholine, tris(trimethylsiloxy)silylpropyl methacrylate, and glycidyl methacrylate;

5) 2-methacryloyloxyethyl phosphorylcholine, polydimethylsiloxane monomethacrylate, and glycidyl methacrylate;

6) 2-methacryloyloxyethyl phosphorylcholine, tris(trimethylsiloxy)silylpropyl methacrylate, and methacryloyloxybenzophenone;

7) 2-methacryloyloxyethyl phosphorylcholine, polydimethylsiloxane monomethacrylate, and methacryloyloxybenzophenone;

8) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene; and 9) 2-methacryloyloxyethyl phosphorylcholine, 3-(3-(methylbis(trimethylsiloxy)silyl)propyl)glycerol-1-methacrylate, and methacryloyloxybenzophenone.

14. A use of the following copolymer for production of a modifier for an ophthalmic device: a copolymer containing: a constituent unit based on a hydrophilic monomer "a" represented by the following formula (1); and a constituent unit based on a silicone monomer "b" represented by the following formula (2) or the following formula (3), the copolymer being incapable of dissolving at 1.0% (w/v) in water at 20° C., and capable of dissolving at 0.1% (w/v) or more in boiling water:

(1)

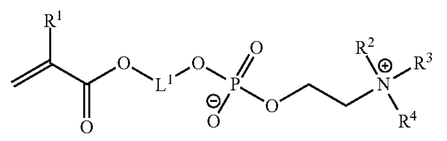

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

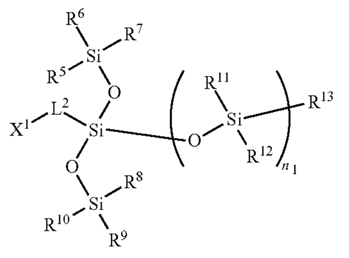

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

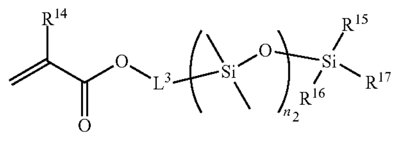

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

15. The use of the copolymer for production of a modifier for an ophthalmic device according to the above-mentioned item 14, wherein the constituent unit based on the hydrophilic monomer "a" represented by the formula (1) is 2-methacryloyloxyethyl phosphorylcholine, the constituent unit based on the silicone monomer "b" represented by the formula (2) or the formula (3) is tris(trimethylsiloxy)silylpropyl methacrylate, polydimethylsiloxane monomethacrylate, 4-(2-hydroxyethyl)-2-methylene-1-(tris(trimethylsiloxy)silylpropyl)butane-1,4-dioate, or 3-(3-(methylbis(trimethylsiloxy) silyl)propyl)glycerol-1-methacrylate, and the constituent unit based on the thermally reactive monomer or the photoreactive monomer "c" is glycidyl methacrylate, methacryloyloxybenzophenone, or 4-(4-azidobenzoyloxymethyl)vinylbenzene.

16. The use of the copolymer for production of a modifier for an ophthalmic device according to the above-mentioned item 14, wherein a combination of the constituent unit based on the hydrophilic monomer "a" represented by the formula (1), the constituent unit based on the silicone monomer "b" represented by the formula (2) or the formula (3), and/or the constituent unit based on the thermally reactive monomer or the photoreactive monomer "c" is any one selected from the following:

1) 2-methacryloyloxyethyl phosphorylcholine and tris(trimethylsiloxy)silylpropyl methacrylate;
2) 2-methacryloyloxyethyl phosphorylcholine and polydimethylsiloxane monomethacrylate;
3) 2-methacryloyloxyethyl phosphorylcholine and 4-(2-hydroxyethyl)-2-methylene-1-(tris(trimethylsiloxy)silylpropyl)butane-1,4-dioate;
4) 2-methacryloyloxyethyl phosphorylcholine, tris(trimethylsiloxy)silylpropyl methacrylate, and glycidyl methacrylate;
5) 2-methacryloyloxyethyl phosphorylcholine, polydimethylsiloxane monomethacrylate, and glycidyl methacrylate;
6) 2-methacryloyloxyethyl phosphorylcholine, tris(trimethylsiloxy)silylpropyl methacrylate, and methacryloyloxybenzophenone;
7) 2-methacryloyloxyethyl phosphorylcholine, polydimethylsiloxane monomethacrylate, and methacryloyloxybenzophenone;
8) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene; and
9) 2-methacryloyloxyethyl phosphorylcholine, 3-(3-(methylbis(trimethylsiloxy)silyl)propyl)glycerol-1-methacrylate, and methacryloyloxybenzophenone.

Advantageous Effects of Invention

The modifier for an ophthalmic device of the present invention can be used to impart high wettability and lubricity to a silicone hydrogel.

DESCRIPTION OF EMBODIMENTS

The present invention is described below in more detail.

As used herein, the term "(meth)acrylic acid" means "acrylic acid or methacrylic acid," and the same applies to other similar terms.

In addition, herein, when preferred numerical ranges (e.g., the ranges of a content or a weight-average molecular weight) are described in stages, the respective lower limit values and upper limit values may be independently combined with each other. For example, in the description: "preferably from 10 to 100, more preferably from 20 to 90," the "preferred lower limit value: 10" and the "more preferred upper limit value: 90" may be combined to obtain a range of "from 10 to 90."

One mode of a copolymer to be incorporated into a modifier for an ophthalmic device or a silicone hydrogel composition of the present invention (hereinafter sometimes referred to as "copolymer of the present invention") is a copolymer obtained by copolymerizing a hydrophilic monomer "a" represented by the following formula (1), and a silicone monomer "b" represented by the following formula (2) or the following formula (3) (copolymer containing a constituent unit based on a hydrophilic monomer "a" represented by the following formula (1) and a constituent unit based on a silicone monomer "b" represented by the following formula (2) or the following formula (3)), the copolymer being incapable of dissolving at 1.0% (w/v) in water at 20° C., and capable of dissolving at 0.1% (w/v) or more in boiling water:

(1)

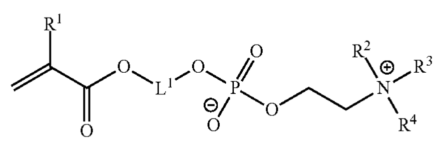

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

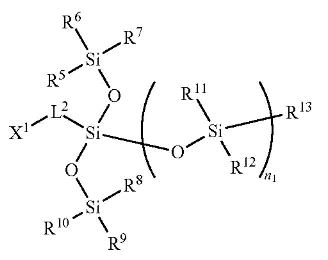

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

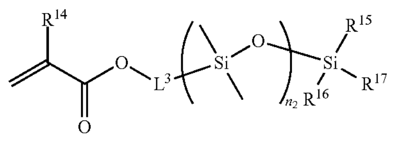

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

[Hydrophilic Monomer "a"]

$R^1$ of the hydrophilic monomer "a" represented by the formula (1) represents a hydrogen atom or a methyl group, but preferably represents a methyl group from the viewpoint of raw material availability.

In addition, $L^1$ represents an organic group having 2 to 6 carbon atoms, and the organic group may optionally contain one ether bond and/or one hydroxy group, but $L^1$ represents preferably $—C_2H_4—$, $—C_2H_4—O—C_2H_4—$, or $—C_2H_5—$, particularly preferably $—C_2H_5—$, from the viewpoint of raw material availability.

Herein, the "organic group" is a group made up of elements like C, Si, N, P, O, and S, and may be a polymer having a repeating unit. In addition, the organic group may contain, in its structure, a group, such as a ketone group, an ester group, an ether group, a hydroxyl group, an amide group, a thioether group, or an isocyanurate group.

In addition, $R^2$ to $R^4$ each independently represent a hydrocarbon group having 1 to 3 carbon atoms, but preferably all represent methyl groups from the viewpoint of raw material availability.

Accordingly, a preferred specific example of the hydrophilic monomer "a" may be 2-methacryloyloxyethyl phosphorylcholine.

As the monomer "a" to be used in the present invention, a single monomer may be used, or a plurality of monomers may be used in combination.

[Silicone Monomer "b"]

$X^1$ of the silicone monomer "b" in the case of being represented by the formula (2) represents any one polymerizable functional group that is a (meth)acryloyloxy group, a 3-(2-hydroxyethyloxycarbonyl)-2-methylenepropanoyloxy group, a 3-(2-hydroxyethyloxycarbonyl)-3-butenoyloxy group, or 3-(2-hydroxyethyloxycarbonyl)-2-propenoyloxy group. Of those, a methacryloyloxy group is preferably selected from the viewpoint of raw material availability, and a 3-(2-hydroxyethyloxycarbonyl)-2-methylenepropanoyloxy group is preferably selected from the viewpoint of compatibility with the hydrophilic monomer.

In addition, $L^2$ represents an organic group having 2 to 6 carbon atoms, and the organic group may optionally contain one ether bond and/or one hydroxy group, but $-n-C_3H_6—$ is preferably selected from the viewpoint of raw material availability.

In addition, $R^5$ to $R^{13}$ each independently represent a methyl group or an ethyl group, but preferably all represent methyl groups from the viewpoint of raw material availability.

In addition, $n_1$ represents 0 or 1, but preferably represents 1 from the viewpoint of enhancing compatibility with the silicone hydrogel composition.

Accordingly, preferred specific examples of the monomer "b" represented by the formula (2) may include tris(trimethylsiloxy)silylpropyl methacrylate and 4-(2-hydroxyethyl)-2-methylene-1-(tris(trimethylsiloxy)silylpropyl)butane-1,4-dioate.

$R^{14}$ of the silicone monomer "b" in the case of being represented by the formula (3) represents a hydrogen atom or a methyl group, but preferably represents a methyl group from the viewpoint of the storage stability of the copolymer to be obtained.

In addition, $L^3$ represents an organic group having 2 to 6 carbon atoms, and the organic group may optionally contain one ether bond and/or one hydroxy group.

In addition, $n_2$ represents an integer of from 4 to 20. In addition, $n_2$ generally has a distribution, and in that case, the number-average value thereof preferably falls within the range of from 4 to 20.

In addition, $R^{15}$ to $R^{17}$ each independently represent an alkyl group having 1 to 8 carbon atoms.

Accordingly, preferred specific examples of the monomer "b" represented by the formula (3) may include polydimethylsiloxane monomethacrylate and one-terminal monomethacryloyloxypropyl-modified polydimethylsiloxane.

As the monomer "b" to be used in the present invention, a single monomer may be used, or a plurality of monomers may be used in combination. In addition, any one of the monomer represented by the formula (2) and the monomer represented by the formula (3) may be used alone, or both thereof may be used in combination.

From the viewpoint of compatibility with the silicone hydrogel monomer blend (silicone hydrogel composition), it is preferred that the monomer represented by the formula (2) be used alone.

[Ratio Between Monomer "a" and Monomer "b"]

A ratio between the monomer "a" and the monomer "b" is preferably set to monomer "a":monomer "b"=2:1 to 300:1 (mass ratio), and is set to more preferably from 5:1 to 50:1, still more preferably from 7:1 to 25:1. When the ratio is set to fall within those ranges, the copolymer is compatibilized with the silicone hydrogel composition in a preferred manner, and exhibits an enhanced effect of imparting wettability and lubricity to a silicone hydrogel obtained by curing the silicone hydrogel composition.

In addition, with respect to 100 parts by mass of the monomer "a", the monomer "b" may be used at from 0.3 part by mass to 50 parts by mass, preferably from 2 parts by mass to 20 parts by mass, more preferably from 4 parts by mass to 14 parts by mass.

In addition, the total ratio of the monomers "a" and "b" in all monomers to be used in the preparation of the copolymer of the present invention is set to preferably from 50 mol % to 100 mol %, more preferably from 90 mol % to 100 mol %. This is because the effect of the present invention is expressed in a preferred manner.

[Thermally Reactive Monomer or Photoreactive Monomer "c"]

Another mode of the copolymer of the present invention is a copolymer obtained by further copolymerizing a thermally reactive monomer or a photoreactive monomer "c" in addition to the above-mentioned monomers "a" and "b" (copolymer containing the constituent unit based on the hydrophilic monomer "a", the constituent unit based on the silicone monomer "b", and a constituent unit based on the thermally reactive monomer or the photoreactive monomer "c"), the copolymer being incapable of dissolving at 1.0% (w/v) in water at 20° C., and capable of dissolving at 0.1% (w/v) or more in boiling water.

The thermally reactive monomer or the photoreactive monomer "c" in the present invention means a monomer having a functional group capable of imparting such reactivity that the copolymer obtained by copolymerizing the monomer "c" can be induced by heating or photoirradiation to form a carbon-carbon covalent bond between the copolymer and an organic substance coexisting therewith.

When a method of preparing a silicone hydrogel involving using the copolymer of the present invention is based on thermal polymerization, the monomer "c" is preferably a thermally reactive monomer to be induced by heating. In addition, when the method of preparing a silicone hydrogel is based on photopolymerization, the monomer "c" is preferably a photoreactive monomer to be induced by photoirradiation.

A preferred specific example of the monomer "c" having reactivity induced by heating is glycidyl (meth)acrylate.

Preferred specific examples of the monomer "c" having reactivity induced by photoirradiation include 4-(meth)acryloyloxybenzophenone and (azidobenzoyloxymethyl)vinylbenzene.

It is also possible within the spirit of the present invention to utilize the reactivity of the monomer "c" described above to introduce a polymerizable functional group, such as a (meth)acrylic group or a vinyl group, through a polymer reaction after the synthesis of the copolymer.

As the monomer "c" to be used in the present invention, a single monomer may be used, or a plurality of monomers may be used in combination.

The ratio of the monomer "c" in all monomers to be used in the preparation of the copolymer of the present invention is set to preferably from 0 mol % to 50 mol %, more preferably from 0 mol % to 10 mol %. This is because the effect of the present invention is expressed in a preferred manner.

[Other Monomer "d" ]

The copolymer obtained by copolymerizing the monomers "a" and "b", and the copolymer obtained by copolymerizing the monomers "a", "b", and "c" of the present invention may each be a copolymer obtained by further copolymerizing another monomer "d" to the extent that the effect of the present invention is not impaired.

The monomer "d" may be arbitrarily selected from monomers copolymerizable with the monomers "a", "b", and "c".

Preferred examples of such monomer include (meth)acrylic acid and derivatives thereof, (meth)acrylamide and derivatives thereof, and a vinyl compound.

Preferred examples of the derivatives of (meth)acrylic acid include: alkyl (meth)acrylates, such as methyl (meth)acrylate and ethyl (meth)acrylate; and hydroxyalkyl (meth)acrylates, such as hydroxyethyl (meth)acrylate and hydroxypropyl (meth)acrylate.

Preferred examples of the (meth)acrylamide derivatives include dimethyl (meth)acrylamide and hydroxyethyl (meth)acrylamide.

Preferred examples of the vinyl compound include: hydroxyalkyl vinyl ethers, such as hydroxyethyl vinyl ether and hydroxybutyl vinyl ether; oligoethylene glycol monovinyl ethers such as diethylene glycol monovinyl ether; and pyrrolidone derivatives such as N-vinylpyrrolidone.

As the monomer "d", a single monomer may be used, or a plurality of monomers may be used in combination.

The ratio of the monomer "d" in all monomers to be used in the preparation of the copolymer of the present invention is preferably set to from 0 mol % to 10 mol %. This is because the effect of the present invention is expressed in a preferred manner.

[Production of Copolymer]

A known method, such as solution polymerization, bulk polymerization, emulsion polymerization, or suspension polymerization, may be used as a polymerization method for obtaining the copolymer of the present invention, and for example, a method such as radical polymerization, involving polymerizing the monomers "a" and "b", and as required, the monomers "c" and "d" in a solvent in the presence of a polymerization initiator, may be adopted.

Any generally used initiator may be used as the initiator to be used for the polymerization reaction, and for example, in the case of radical polymerization, an aliphatic azo compound, an organic peroxide, a persulfuric acid salt, or the like may be used. Examples of those polymerization initiators include 2,2'-azobis(isobutyronitrile), 2,2'-azobis(2,4-dimethylvaleronitrile), benzoyl peroxide, lauroyl peroxide, diisopropyl peroxydicarbonate, t-butyl peroxy-2-ethylhexanoate, t-butyl peroxypivalate, t-butyl peroxydiisobutyrate, potassium persulfate, and ammonium persulfate. Those polymerization initiators may be used as a mixture thereof. In addition, a redox-type radical promoter may be used with the polymerization initiator.

A polymerization temperature is preferably from 30° C. to 80° C., more preferably from 40° C. to 70° C. In addition, a polymerization time is preferably from 2 hours to 72 hours. This is because the polymerization reaction proceeds satisfactorily.

Further, a solvent may be used in order to smoothly perform the polymerization reaction, and examples of the solvent may include water, alcohols, such as methanol, ethanol, and propanol, benzene, toluene, dimethylformamide, tetrahydrofuran, dioxane, chloroform, and mixed solvents thereof.

[Molecular Weight of Copolymer]

The weight-average molecular weight of the copolymer of the present invention is set to preferably from 20,000 to 2,000,000, more preferably from 50,000 to 1,600,000, still more preferably from 100,000 to 1,000,000, particularly preferably from 200,000 to 500,000. When the weight-average molecular weight is set to fall within such ranges, the copolymer is easily compatibilized with the silicone hydrogel monomer blend (silicone hydrogel composition), and besides, can impart wettability and lubricity to a silicone hydrogel in a preferred manner.

The weight-average molecular weight of the copolymer of the present invention is determined, for example, in terms of polyethylene glycol through gel permeation chromatography (GPC) measurement using an EcoSEC system (manufactured by Tosoh Corporation).

[Water Solubility of Copolymer]

The copolymer of the present invention is incapable of dissolving at 1.0% (w/v) in water at 20° C., and capable of dissolving at 0.1% (w/v) or more in boiling water.

In the case of having such high water solubility as to be capable of dissolving at 1.0% (w/v) or more in water at 20° C., there is an increased risk in that compatibility with a silicone hydrogel monomer blend containing a silicone component having high hydrophobicity is impaired. In addition, with such low water solubility as to be incapable of dissolving at 0.1% (w/v) in boiling water, there is a high risk in that the effect of imparting wettability to a silicone hydrogel is impaired.

The water solubility of the copolymer of the present invention can be easily evaluated by, for example, such a procedure as described below.

(1) An appropriate amount of the copolymer is weighed in a hermetically sealable heat-resistant container. An example of such container is a glass vacuum vial.

(2) Pure water is added to the container so as to adjust the concentration of the copolymer to a predetermined concentration.

For example, when the concentration is adjusted to 5.0% (w/v), 10 mL of pure water is added with respect to 0.5 g of the copolymer.

(3) The mixture is stirred under the condition of 20° C., and solubility is visually determined.

(4) The mixture is boiled under normal pressure for 30 minutes and then stirred, and returned to room temperature, followed by visual determination of solubility. (solubility in boiling water)

Autoclave treatment at 121° C. for 20 minutes may be performed in place of the boiling.

As used herein, the term "dissolve" refers to a state in which, under visual observation, all of the copolymer loaded mixes uniformly with water, and hence no insoluble matter, turbidness, or stagnation can be visually recognized.

The water solubility of the copolymer of the present invention is positively correlated with the value of the monomer "a"/monomer "b" ratio (mass ratio) of the copolymer, and is negatively correlated with the weight-average molecular weight of the copolymer.

In view of the foregoing, a water solubility index (WSI) may be defined as shown in the following equation (4).

Monomer

Mass Ratio

Weight-Average Molecular Weight $$WSI \equiv \frac{\text{monomer } a}{\text{monomer } b}[\text{Mass ratio}] \times \frac{1000}{\text{weight-average molecular weight}} \times 10^3 \quad (4)$$

The above-mentioned WSI is preferably 5 or more and 1,000 or less, and is set to more preferably 9 or more and 700 or less, still more preferably 20 or more and 300 or less.

When the WSI falls within the above-mentioned ranges, a copolymer having preferred water solubility is easily obtained.

[Silicone Hydrogel Composition]

The present invention also encompasses the following silicone hydrogel composition.

A silicone hydrogel composition containing: a copolymer containing a constituent unit based on a hydrophilic monomer "a" represented by the following formula (1), and a constituent unit based on a silicone monomer "b" represented by the following formula (2) or the following formula (3), or a copolymer containing the constituent unit based on the hydrophilic monomer "a" represented by the following formula (1), the constituent unit based on the silicone monomer "b" represented by the following formula (2) or the following formula (3), and a constituent unit based on a thermally reactive monomer or a photoreactive monomer "c", the copolymer being incapable of dissolving at 1.0% (w/v) in water at 20° C., and capable of dissolving at 0.1% (w/v) or more in boiling water; and a base composition, wherein a content of the copolymer is from 0.05 part by mass to 2 parts by mass with respect to 100 parts by mass of the base composition:

(1)

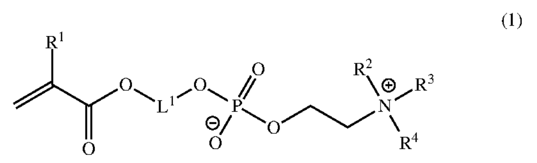

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

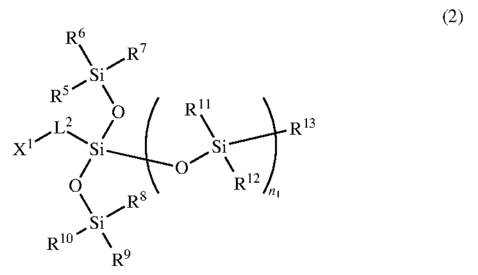

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

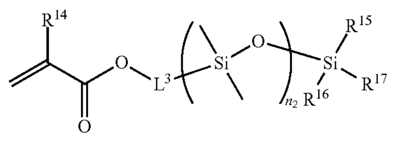

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

[Silicone Hydrogel]

Another embodiment of the present invention is a silicone hydrogel obtained by curing a monomer composition (silicone hydrogel composition) containing 0.05 part by mass to 2 parts by mass of the copolymer of the present invention with respect to 100 parts by mass of a base composition.

The amount of the copolymer of the present invention in the silicone hydrogel composition is more preferably set to from 0.1 part by mass to 1 part by mass. In this case, the copolymer is compatibilized with the silicone hydrogel composition in a preferred manner, and besides, can impart wettability and lubricity to a silicone hydrogel in a more preferred manner.

Overall, the above-mentioned suitable ranges mean that the proportion of the monomer "a" in 100 parts by weight of the silicone hydrogel composition of the present invention is preferably expected to be not more than 2 parts by mass. That is, wettability and lubricity can be imparted to a silicone hydrogel in a preferred manner by blending the MPC-type hydrophilic monomer in a much smaller amount than in the related art.

The term "base composition" as used herein refers to a mixture of monomers, a reaction initiator, and any other component to be added as required, for preparing a silicone hydrogel.

The base composition preferably contains 15 parts by weight or more in total of an alcohol such as propanol and a hydroxy group-containing monomer such as hydroxyethyl (meth)acrylate. This is because the compatibility of the copolymer of the present invention is enhanced.

Examples of the compound to be incorporated into the base composition include, but not particularly limited to, propanol, hexanol, hydroxyethyl (meth)acrylate, hydroxypropyl (meth)acrylate, N-vinylpyrrolidone, methyl (meth) acrylate, tetraethylene glycol di(meth)acrylate, triethylene glycol divinyl ether, (meth)acrylic acid, aminoethyl (meth) acrylate, 4-(2-hydroxyethyl)-2-methylene-1-(tris(trimethylsiloxy)silylpropyl)butane-1,4-dioate, polydimethylsiloxane mono(meth)acrylate.

The preparation of the silicone hydrogel composition, and the preparation of a silicone hydrogel making use thereof may be performed using such known methods as disclosed in, for example, WO 2020/054711 A1.

The step of curing the silicone hydrogel composition is preferably based on heating (thermal polymerization) or photoirradiation (photopolymerization).

[Method of Producing Silicone Hydrogel, Including Step of Curing Silicone Hydrogel Composition Containing Copolymer of the Present Invention]

The present invention also encompasses the following method of producing a silicone hydrogel.

A method of producing a silicone hydrogel, including a step of curing a silicone hydrogel composition containing the copolymer of the present invention.

The copolymer is a copolymer containing a constituent unit based on a hydrophilic monomer "a" represented by the following formula (1) and a constituent unit based on a silicone monomer "b" represented by the following formula (2) or the following formula (3), the copolymer being incapable of dissolving at 1.0% (w/v) in water at 20° C., and capable of dissolving at 0.1% (w/v) or more in boiling water:

(1)

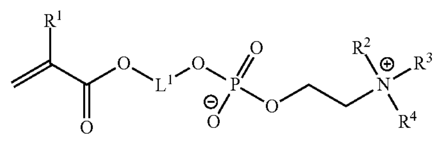

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

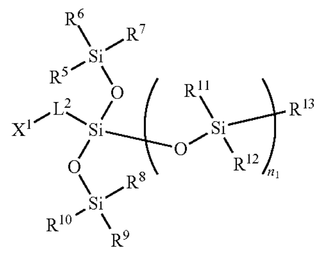

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

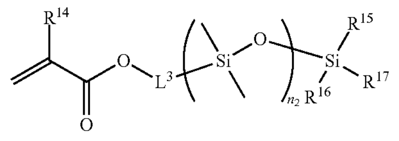

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

It is preferred that the amount of the copolymer in the silicone hydrogel composition be from 0.1 part by mass to 1 part by mass.

It is preferred that the silicone hydrogel composition further contain a base composition, and the content of the copolymer be from 0.05 part by mass to 2 parts by mass with respect to 100 parts by mass of the base composition.

[Use of Copolymer of the Present Invention for Production of Modifier for an Ophthalmic Device]

The present invention also encompasses the following use of the copolymer of the present invention for production of a modifier for an ophthalmic device.

A use of the following copolymer of the present invention for production of a modifier for an ophthalmic device: a copolymer containing a constituent unit based on a hydrophilic monomer "a" represented by the following formula (1) and a constituent unit based on a silicone monomer "b" represented by the following formula (2) or the following formula (3), the copolymer being incapable of dissolving at 1.0% (w/v) in water at 20° C., and capable of dissolving at 0.1% (w/v) or more in boiling water:

(1)

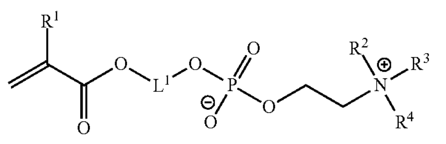

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

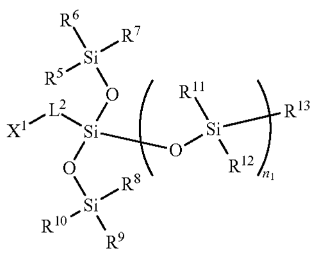

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

(3)

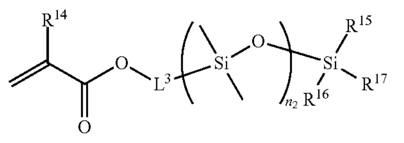

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms.

The combination of the constituent unit based on the hydrophilic monomer "a" represented by the formula (1), the constituent unit based on the silicone monomer "b" represented by the formula (2) or the formula (3), the constituent unit based on the thermally reactive monomer or the photoreactive monomer "c", and/or the constituent unit based on the other monomer "d" in the copolymer of the present invention may be exemplified by those shown in Table 1 below.

In addition, a person skilled in the art can obtain copolymers containing various constituent units by appropriately changing the structures of the constituent units shown in Table 1.

EXAMPLES

The present invention is described in more detail below by way of Examples, but the present invention is not limited thereto.

[Synthesis of Copolymers]

For the synthesis of copolymers to be used for Examples, 14 kinds of copolymers shown in Table 1, that is, copolymers 1-1 to 3-6 falling within the scope of the present invention were synthesized.

Synthesis Example 1-1

22.5 g of 2-methacryloyloxyethyl phosphorylcholine (hereinafter referred to as MPC) and 1.0 g of tris(trimethylsiloxy)silylpropyl methacrylate (hereinafter referred to as TRIS) (monomer composition molar ratio: MPC/TRIS=97/3) were weighed in a polymerization flask made of glass, and were dissolved by adding 35.3 g of ethanol serving as a polymerization solvent. After the inside of the reaction vessel had been sufficiently purged with nitrogen, 12 mg of 2,2'-azobis(2,4-dimethylvaleronitrile) (hereinafter referred to as ADVN) was added as a polymerization initiator, and a polymerization reaction was performed by slowly increasing the temperature to 60° C. and holding the temperature at 60° C. overnight. The resultant reaction liquid was dropped into a large excess of acetone to precipitate a polymer. The precipitate was separated by filtration, washed with acetone, and then vacuum-dried to provide the copolymer 1-1 as a white solid.

The weight-average molecular weight of the resultant copolymer 1-1 was determined to be 356,000 in terms of polyethylene glycol through gel permeation chromatography (hereinafter referred to as GPC) measurement.

Synthesis Example 1-2

21.2 g of MPC and 2.3 g of TRIS (monomer composition molar ratio: MPC/TRIS=93/7) were weighed in a polymerization flask made of glass, and were dissolved by adding 35.3 g of n-propanol (hereinafter referred to as NPA) serving as a polymerization solvent. After the inside of the reaction vessel had been sufficiently purged with nitrogen, 12 mg of ADVN was added as a polymerization initiator, and then polymerization and recovery were performed in the same manner as in Synthesis Example 1-1 to provide the copolymer 1-2 as a white solid.

The weight-average molecular weight of the resultant copolymer 1-2 was determined to be 288,000 in terms of polyethylene glycol through GPC measurement.

Synthesis Example 1-3

19.5 g of MPC and 4.0 g of TRIS (monomer composition molar ratio: MPC/TRIS=87.5/12.5) were weighed in a polymerization flask made of glass, and were dissolved by adding 35.3 g of NPA serving as a polymerization solvent. After the inside of the reaction vessel had been sufficiently purged with nitrogen, 8 mg of ADVN was added as a polymerization initiator, and then polymerization and recovery were performed in the same manner as in Synthesis Example 1-1 to provide the copolymer 1-3 as a white solid.

The weight-average molecular weight of the resultant copolymer 1-3 was determined to be 411,000 in terms of polyethylene glycol through GPC measurement.

Synthesis Example 1-4

23.1 g of MPC and 0.5 g of polydimethylsiloxane monomethacrylate (manufactured by Shin-Etsu Chemical Co., Ltd., hereinafter referred to as PDMSMA) (monomer composition molar ratio: MPC/PDMSMA=99.4/0.6, calculated assuming the number-average molecular weight of PDMSMA to be 1,000) were weighed in a polymerization flask made of glass, and were dissolved by adding 94.1 g of NPA serving as a polymerization solvent. After the inside of the reaction vessel had been sufficiently purged with nitrogen, 6 mg of ADVN was added as a polymerization initiator, and then polymerization and recovery were performed in the same manner as in Synthesis Example 1-1 to provide the copolymer 1-4 as a white solid.

The weight-average molecular weight of the resultant copolymer 1-4 was determined to be 364,000 in terms of polyethylene glycol through GPC measurement.

Synthesis Example 1-5

23.1 g of MPC and 0.5 g of PDMSMA (monomer composition molar ratio: MPC/PDMSMA=99.4/0.6) were weighed in a polymerization flask made of glass, and were dissolved by adding 35.3 g of NPA serving as a polymerization solvent. After the inside of the reaction vessel had been sufficiently purged with nitrogen, 8 mg of 2,2'-azobis (isobutyronitrile) (hereinafter referred to as AIBN) was added as a polymerization initiator, and then polymerization and recovery were performed in the same manner as in Synthesis Example 1-1 to provide the copolymer 1-5 as a white solid.

The weight-average molecular weight of the resultant copolymer 1-5 was determined to be 1,550,000 in terms of polyethylene glycol through GPC measurement.

Synthesis Example 1-6

21.4 g of MPC, 2.6 g of 4-(2-hydroxyethyl)-2-methylene-1-(tris(trimethylsiloxy)silylpropyl)butane-1,4-dioate (hereinafter referred to as ETS), and 1.0 g of hydroxyethylacrylamide (hereinafter referred to as HEAA) (monomer composition molar ratio: MPC/ETS/HEAA=84/6/10) were weighed in a polymerization flask made of glass, and were dissolved by adding 100.0 g of NPA serving as a polymerization solvent. After the inside of the reaction vessel had been sufficiently purged with nitrogen, 6 mg of ADVN was added as a polymerization initiator, and then polymerization and recovery were performed in the same manner as in Synthesis Example 1-1 to provide the copolymer 1-6 as a white solid.

The weight-average molecular weight of the resultant copolymer 1-6 was determined to be 301,000 in terms of polyethylene glycol through GPC measurement.

Synthesis Example 2-1

19.0 g of MPC, 2.1 g of TRIS, and 1.1 g of glycidyl methacrylate (hereinafter referred to as GMA) (monomer composition molar ratio: MPC/TRIS/GMA=84/6/10) were weighed in a polymerization flask made of glass, and were dissolved by adding 88.9 g of NPA serving as a polymerization solvent. After the inside of the reaction vessel had been sufficiently purged with nitrogen, 55 mg of ADVN was added as a polymerization initiator, and then polymerization and recovery were performed in the same manner as in Synthesis Example 1-1 to provide the copolymer 2-1 as a white solid.

The weight-average molecular weight of the resultant copolymer 2-1 was determined to be 72,000 in terms of polyethylene glycol through GPC measurement.

Synthesis Example 2-2

20.7 g of MPC, 0.4 g of PDMSMA, and 1.1 g of GMA (monomer composition molar ratio: MPC/PDMSMA/GMA=89.5/0.5/10) were weighed in a polymerization flask made of glass, and were dissolved by adding 88.9 g of NPA serving as a polymerization solvent. After the inside of the reaction vessel had been sufficiently purged with nitrogen, 55 mg of ADVN was added as a polymerization initiator, and then polymerization and recovery were performed in the same manner as in Synthesis Example 1-1 to provide the copolymer 2-2 as a white solid.

The weight-average molecular weight of the resultant copolymer 2-2 was determined to be 150,000 in terms of polyethylene glycol through GPC measurement.

Synthesis Example 3-1

18.4 g of MPC, 1.9 g of TRIS, and 2.0 g of 4-methacryloyloxybenzophenone (hereinafter referred to as MBP) (monomer composition molar ratio: MPC/TRIS/MBP=84/6/10) were weighed in a polymerization flask made of glass, and were dissolved by adding 88.9 g of NPA serving as a polymerization solvent. After the inside of the reaction vessel had been sufficiently purged with nitrogen, 55 mg of ADVN was added as a polymerization initiator, and then polymerization and recovery were performed in the same manner as in Synthesis Example 1-1 to provide the copolymer 3-1 as a white solid.

The weight-average molecular weight of the resultant copolymer 3-1 was determined to be 72,000 in terms of polyethylene glycol through GPC measurement.

Synthesis Example 3-2

16.0 g of MPC, 3.3 g of TRIS, and 1.8 g of MBP (monomer composition molar ratio: MPC/TRIS/MBP=79/11/10) were weighed in a polymerization flask made of glass, and were dissolved by adding 84.2 g of NPA serving as a polymerization solvent. After the inside of the reaction vessel had been sufficiently purged with nitrogen, 52 mg of ADVN was added as a polymerization initiator, and then polymerization and recovery were performed in the same manner as in Synthesis Example 1-1 to provide the copolymer 3-2 as a white solid.

The weight-average molecular weight of the resultant copolymer 3-2 was determined to be 21,000 in terms of polyethylene glycol through GPC measurement.

Synthesis Example 3-3

21.0 g of MPC, 0.4 g of PDMSMA, and 2.1 g of MBP (monomer composition molar ratio: MPC/PDMSMA/MBP=89.5/0.5/10) were weighed in a polymerization flask made of glass, and were dissolved by adding 94.1 g of NPA serving as a polymerization solvent. After the inside of the reaction vessel had been sufficiently purged with nitrogen, 59 mg of ADVN was added as a polymerization initiator, and then polymerization and recovery were performed in the same manner as in Synthesis Example 1-1 to provide the copolymer 3-3 as a white solid.

The weight-average molecular weight of the resultant copolymer 3-3 was determined to be 105,000 in terms of polyethylene glycol through GPC measurement.

Synthesis Example 3-4

21.0 g of MPC, 0.4 g of PDMSMA, and 2.1 g of MBP (monomer composition molar ratio: MPC/PDMSMA/MBP=89.5/0.5/10) were weighed in a polymerization flask made of glass, and were dissolved by adding 35.3 g of NPA serving as a polymerization solvent. After the inside of the reaction vessel had been sufficiently purged with nitrogen, 6 mg of ADVN was added as a polymerization initiator, and then polymerization and recovery were performed in the same manner as in Synthesis Example 1-1 to provide the copolymer 3-4 as a white solid.

The weight-average molecular weight of the resultant copolymer 3-4 was determined to be 951,000 in terms of polyethylene glycol through GPC measurement.

Synthesis Example 3-5

20.2 g of MPC, 2.5 g of ETS, and 2.3 g of 4-(4-azidobenzoyloxymethyl)vinylbenzene (hereinafter referred to as AzSt) (monomer composition molar ratio: MPC/ETS/AzSt=84/6/10) were weighed in a polymerization flask made of glass, and were dissolved by adding 100.0 g of NPA serving as a polymerization solvent. After the inside of the reaction vessel had been sufficiently purged with nitrogen, 62 mg of ADVN was added as a polymerization initiator, and then polymerization and recovery were performed in the same manner as in Synthesis Example 1-1 to provide the copolymer 3-5 as a white solid.

The weight-average molecular weight of the resultant copolymer 3-5 was determined to be 70,000 in terms of polyethylene glycol through GPC measurement.

Synthesis Example 3-6

18.4 g of MPC, 1.9 g of 3-(3-(methylbis(trimethylsiloxy)silyl)propyl)glycerol-1-methacrylate (hereinafter referred to as SiGMA), and 2.0 g of MBP (monomer composition molar ratio: MPC/SiGMA/MBP=84/6/10) were weighed in a polymerization flask made of glass, and were dissolved by adding 88.9 g of NPA serving as a polymerization solvent. After the inside of the reaction vessel had been sufficiently purged with nitrogen, 55 mg of ADVN was added as a polymerization initiator, and then polymerization and recovery were performed in the same manner as in Synthesis Example 1-1 to provide the copolymer 3-6 as a white solid.

The weight-average molecular weight of the resultant copolymer 3-6 was determined to be 74,000 in terms of polyethylene glycol through GPC measurement.

[GPC Measurement]

The GPC measurement of each of the copolymers of Synthesis Examples 1-1 to 3-6 described above was performed under the following conditions.

GPC system: EcoSEC system (manufactured by Tosoh Corporation)

Column: Shodex OHpak SB-802.5HQ (manufactured by Showa Denko K.K.) and SB-806HQ (manufactured by Showa Denko K.K.) connected in series Developing solvent: 20 mM sodium phosphate buffer (pH 7.4)

Detector: differential refractive index detector

Molecular weight standard: EasiVial PEG/PEO (manufactured by Agilent Technologies, Inc.)

Flow rate: 0.5 mL/min

Column temperature: 40° C.

Sample: the obtained copolymer diluted at a final concentration of 0.1 wt % with the developing solvent Injection volume: 100 μL

[Determination of Water Solubility]

Determination of the water solubility of each of the copolymers described in Synthesis Examples 1-1 to 3-6 described above was performed by the following procedure.

(1) An appropriate amount of each copolymer was weighed in a 30 cc glass vial so as to have a predetermined concentration described below.

(2) 10 mL of ion-exchanged water was added.

(3) The mixture was stirred under the condition of 20° C., and solubility in water at 20° C. was visually determined.

(4) The mixture was autoclaved at 121° C. for 20 minutes and then stirred, and returned to room temperature, followed by visual determination of solubility in boiling water.

(5) The above-mentioned (1) to (4) were performed for concentrations of 0.1% (w/v), 0.5% (w/v), 1.0% (w/v), and 5.0% (w/v)

(6) For each of the water at 20° C. and the boiling water, the maximum concentration at which the copolymer was determined to dissolve among the above-mentioned four concentrations was recorded. It should be noted that a case in which the copolymer did not dissolve even at 0.1% (w/v) was recorded as "x".

The water solubility and weight-average molecular weight of each of the copolymers obtained in Synthesis Examples 1-1 to 3-6 described above are shown in Table 1.

TABLE 1

| | Synthesis procedure | Kind of monomer (*1) Monomer "a" | Monomer "b" | Monomer "c" | Monomer "d" | Ratio of monomers a:b [mass ratio] | a:b:c:d [mol %] | Weight-average molecular weight [$\times 10^3$] | Water solubility (*2) Room temperature | Boiling water |
|---|---|---|---|---|---|---|---|---|---|---|
| Copolymer 1-1 | Synthesis Example 1-1 | MPC | TRIS | – | – | 23:1 | 97:3:0:0 | 356 | 0.5% | 5.0% |
| Copolymer 1-2 | Synthesis Example 1-2 | MPC | TRIS | – | – | 9:1 | 93:7:0:0 | 288 | × | 5.0% |
| Copolymer 1-3 | Synthesis Example 1-3 | MPC | TRIS | – | – | 5:1 | 87.5:12.5:0:0 | 411 | × | 0.1% |
| Copolymer 1-4 | Synthesis Example 1-4 | MPC | PDMSMA | – | – | 50:1 | 99.4:0.6:0:0 | 364 | × | 5.0% |
| Copolymer 1-5 | Synthesis Example 1-5 | MPC | PDMSMA | – | – | 50:1 | 99.4:0.6:0:0 | 1,550 | × | 5.0% |
| Copolymer 1-6 | Synthesis Example 1-6 | MPC | ETS | – | HEAA | 8:1 | 84:6:0:10 | 301 | × | 5.0% |
| Copolymer 2-1 | Synthesis Example 2-1 | MPC | TRIS | GMA | – | 10:1 | 84:6:10:0 | 72 | 0.5% | 5.0% |
| Copolymer 2-2 | Synthesis Example 2-2 | MPC | PDMSMA | GMA | – | 47:1 | 89.5:0.5:10:0 | 150 | 0.1% | 5.0% |
| Copolymer 3-1 | Synthesis Example 3-1 | MPC | TRIS | MBP | – | 10:1 | 84:6:10:0 | 72 | 0.5% | 5.0% |
| Copolymer 3-2 | Synthesis Example 3-2 | MPC | TRIS | MBP | – | 5:1 | 79:11:10:0 | 21 | × | 1.0% |
| Copolymer 3-3 | Synthesis Example 3-3 | MPC | PDMSMA | MBP | – | 45:1 | 89.5:0.5:10:0 | 105 | 0.1% | 5.0% |
| Copolymer 3-4 | Synthesis Example 3-4 | MPC | PDMSMA | MBP | – | 45:1 | 89.5:0.5:10:0 | 951 | × | 5.0% |
| Copolymer 3-5 | Synthesis Example 3-5 | MPC | ETS | AzSt | – | 10:1 | 84:6:10:0 | 70 | 0.5% | 5.0% |
| Copolymer 3-6 | Synthesis Example 3-6 | MPC | SiGMA | MBP | – | 10:1 | 84:6:10:0 | 74 | 0.5% | 5.0% |

*1

MPC: 2-methacryloyloxyethyl phosphorylcholine
TRIS: tris(trimethylsiloxy)silylpropyl methacrylate
PDMSMA: polydimethylsiloxane monomethacrylate
ETS: 4-(2-hydroxyethyl)-2-methylene-1-(tris(trimethylsiloxy)silylpropyl)butane-1,4-dioate
HEAA: hydroxyethylacrylamide
GMA: glycidyl methacrylate
MBP: methacryloyloxybenzophenone
AzSt: 4-(4-azidobenzoyloxymethyl)vinylbenzene
SiGMA: 3-(3-(methylbis(trimethylsiloxy)silyl)propyl)glycerol-1-methacrylate
-: The monomer of interest is not contained.

*2

For each of water at 20° C. and boiling water (100° C. or more), the maximum concentration at which each copolymer dissolved is shown (unit: % (w/v)). It should be noted that a copolymer that did not dissolve at 0.1% (w/v) is indicated as "x".

The copolymers 1-1 to 3-6 were each determined to be incapable of dissolving at 1.0% (w/v) in water at 20° C., and capable of dissolving at 0.1% (w/v) or more in boiling water.

[Preparation of Silicone Hydrogel Composition]

Silicone hydrogels were prepared, and were subjected to evaluations to be described later to verify the effects of the copolymer of the present invention.

Silicone hydrogels to be used for Examples and Comparative Examples were prepared in the following manner.

[Preparation of Monomer Composition]

Predetermined amounts of the copolymers prepared in Synthesis Examples described above were mixed with lens monomers of common compositions Heat 1 to Heat 3 and Light 1 and Light 2 shown in Table 2 to prepare monomer compositions.

The monomer compositions were prepared by: weighing and mixing predetermined amounts of the copolymers prepared in Synthesis Examples (see Table 3), NPA, and hydroxyethyl methacrylate (hereinafter referred to as HEMA); then adding predetermined amounts of N-vinylpyrrolidone (hereinafter referred to as NVP), methyl methacrylate (hereinafter referred to as MMA) in each of Light 1 and Light 2, tetraethylene glycol dimethacrylate (hereinafter referred to as TEGDMA), triethylene glycol divinyl ether (hereinafter referred to as TEGDV), methacrylic acid (hereinafter referred to as MA) in Heat 2, and aminoethyl methacrylate (hereinafter referred to as AeMA) in Heat 3, followed by mixing again; adding ETS, followed by mixing yet again; adding PDMSMA, followed by mixing still yet again; and finally adding AIBN serving as a reaction initiator in each of Heat 1 to Heat 3, 2-hydroxy-2-methyl-1-phenyl-propanone (hereinafter referred to as 0-1173) serving as a reaction initiator in Light 1, or bis(2,4,6-trimethylbenzoyl) phenylphosphine oxide (hereinafter referred to as 0-819) serving as a reaction initiator in Light 2.

TABLE 2

| Common composition | | Heat 1 | Heat 2 | Heat 3 | Light 1 | Light 2 |
|---|---|---|---|---|---|---|
| Monomer composition [wt %] | NPA | 12.7 | 12.7 | 12.7 | 11.6 | 11.7 |
| | HEMA | 16.9 | 16.9 | 16.8 | 11.6 | 11.7 |
| | NVP | 33.8 | 33.8 | 33.7 | 34.7 | 31.0 |
| | MMA | – | – | – | 7.72 | 7.78 |
| | TEGDMA | 0.7 | 0.7 | 0.7 | 1.2 | 1.2 |
| | TEGDV | 1.7 | 1.7 | 1.7 | 1.5 | 0.78 |
| | MA | – | 0.02 | – | – | |
| | AeMA | – | – | 0.32 | – | |
| | ETS | 12.7 | 12.7 | 12.7 | 15.4 | 15.6 |
| | PDMSMA | 21.1 | 21.1 | 21.0 | 15.4 | 19.5 |
| | AIBN | 0.4 | 0.4 | 0.4 | – | |
| | O-1173 | | – | | 0.88 | – |
| | O-819 | | – | | – | 0.78 |
| | Total | | | 100.0 | | |
| Curing method | | | Heat | | Light (365 nm) | Light (405 nm) |

NPA: n-propanol
HEMA: hydroxyethyl methacrylate
NVP: N-vinylpyrrolidone
MMA: methyl methacrylate
TEGDMA: tetraethylene glycol dimethacrylate
TEGDV: triethylene glycol divinyl ether
MA: methacrylic acid
AeMA: aminoethyl methacrylate (11 wt % aqueous solution)
ETS: 4-(2-hydroxyethyl)-2-methylene-1-(tris(trimethylsiloxy)silylpropyl)butane-1,4-dioate
PDMSMA: polydimethylsiloxane monomethacrylate
AIBN: 2,2'-azobis(isobutyronitrile)
O-1173: 2-hydroxy-2-methyl-1-phenylpropanone
O-819: bis(2,4,6-trimethylbenzoyl)phenylphosphine oxide

[Preparation of Silicone Hydrogel by Thermal Curing]

In order to mold each of the above-mentioned monomer compositions Heat 1, Heat 2, and Heat 3 (see Table 2) into a disc shape as a contact lens model, the monomer compositions were each poured into a mold made of polypropylene having inside dimensions of φ1.1 cm×0.1 mm, and the mold was left at rest in an oven. After the inside of the oven had been purged with nitrogen, thermal curing was performed by slowly increasing the temperature to 80° C. and holding the temperature at 80° C. for 12 hours, to thereby provide a cured product.

The cured product was taken out of the mold, and each cured product was subjected to purification involving extracting and removing unreacted substances and the like, by being immersed in 40 g of iso-propanol (hereinafter referred to as IPA) for 4 hours and then immersed in 50 g of ion-exchanged water for 4 hours.

Next, the above-mentioned cured product was taken out and immersed in physiological saline described in ISO-18369-3 (hereinafter referred to as PBS) for 4 hours, and was then subjected to autoclave sterilization in a state of being immersed in fresh PBS, to thereby provide a silicone hydrogel.

[Preparation of Silicone Hydrogel by Photocuring]

In order to mold each of the above-mentioned monomer compositions Light 1 and Light 2 (see Table 2) into a disc shape as a contact lens model, the monomer compositions were each poured into a mold made of polypropylene having inside dimensions of φ1.1 cm×0.1 mm, and the mold was left at rest in a photoirradiation device. Photocuring was performed by irradiation with light having a wavelength of 365 nm or 405 nm and an irradiance of 1.5 mW/$cm^2$ for 20 minutes to provide a cured product.

After that, in the same manner as in the case of the thermal curing, the cured product was taken out, purified, and sterilized to provide a silicone hydrogel.

[Compatibility of Monomer Composition]

Each prepared monomer composition was placed in a transparent glass container, and the compatibility of the monomer composition was visually evaluated in accordance with the following criteria.

++: Uniform and transparent
+: Slightly turbid and scattering light
x: Turbid and precipitated

[Evaluations of Silicone Hydrogel]

Each prepared silicone hydrogel was subjected to the following evaluations.

[Transparency]

The transparency of the prepared silicone hydrogel was visually determined by the following criteria.

++: Transparent
+: Slightly turbid
x: Clouded

[Shape]

The shape of the prepared silicone hydrogel was visually evaluated by the following criteria.

++: No distortion is found.
+: Slight distortion is found.
x: Distortion and curing failure are found.

[Wettability]

The surface wettability of the prepared silicone hydrogel was evaluated by the following procedure.

(1) The prepared silicone hydrogel immersed in PBS was taken out into the air using tweezers.
(2) The surface of the silicone hydrogel was visually observed, and a period of time between its being taken out and the start of breakage of a water film on the surface [seconds] (BUT) was measured. That is, evaluation was performed on the assumption that a longer BUT indicated higher surface wettability.

(3) Determination was performed in accordance with the following criteria.

+++: 30 seconds≤BUT

++: 10 seconds≤BUT<30 seconds

+: 5 seconds≤BUT<10 seconds x: BUT<5 seconds

[Lubricity]

The surface lubricity of the prepared silicone hydrogel was evaluated by the following procedure.

(1) The silicone hydrogel lens was picked up with a thumb and a middle finger.

(2) A score of from 0 points to 10 points was given through sensory evaluation with the lubricity of Polymacon being defined as 2 points and the lubricity of Omafilcon A being defined as 8 points. That is, a higher score indicates higher lubricity.

(3) Determination was performed in accordance with the following criteria.

+++: From 8 points to 10 points

++: From 5 points to 7 points

+: 3 points or 4 points x: From 0 points to 2 points

Examples 1-1 to 1-5

The evaluations were performed for silicone hydrogels obtained when each of the copolymers 1-1 to 1-3 whose monomer "b" was represented by the formula (2) was added to a silicone hydrogel composition. Heat 1 was used as the common composition, and curing was performed by the thermal curing.

Examples 1-6 and 1-7

The evaluations were performed for silicone hydrogels obtained when each of the copolymers 1-4 and 1-5 was added to a silicone hydrogel composition. Heat 1 was used as the common composition, and curing was performed by the thermal curing.

Example 1-8

The evaluation was performed for a silicone hydrogel obtained when the copolymer 1-6 was added to a silicone hydrogel composition. Heat 1 was used as the common composition, and curing was performed by the thermal curing.

Examples 2-1 to 2-4

The evaluations were performed for silicone hydrogels obtained in the same manner as in Example 1 with use of the copolymers, common compositions, and curing method shown in Table 3.

Examples 3-1 to 3-8

The evaluations were performed for silicone hydrogels obtained in the same manner as in Example 1 with use of the copolymers and common composition shown in Table 3. Curing was performed by irradiation with ultraviolet light having a wavelength of 365 nm and an irradiance of 1.5 $mW/cm^2$.

Example 3-9

The evaluations were performed for a silicone hydrogel obtained in the same manner as in Example 1 with use of the copolymer and common composition shown in Table 3. Curing was performed by irradiation with violet light having a wavelength of 405 nm and an irradiance of 1.5 $mW/cm^2$.

The preparation of the silicone hydrogels performed by the above-mentioned procedures, and the evaluation results thereof are shown in Table 3.

TABLE 3

| | | | Example | | | | | | | |
|---|---|---|---|---|---|---|---|---|---|---|
| | | | 1-1 | 1-2 | 1-3 | 1-4 | 1-5 | 1-6 | 1-7 | 1-8 |
| | Common composition | | Heat 1 | | | | | | | |
| | Curing method | | Thermal curing | | | | | | | |
| Copolymer of the present invention | Copolymer | | 1-1 | 1-2 | 1-3 | 1-2 | | 1-4 | 1-5 | 1-6 |
| | Constituent monomer (*1) | Monomer "a" | | MPC | | MPC | | MPC | | MPC |
| | | Monomer "b" | | TRIS | | TRIS | | PDMSMA | | ETS |
| | | Monomer "c" | | – | | – | | – | | – |
| | | Monomer "d" | | – | | – | | – | | HEAA |
| | Monomer "a"/monomer "b" [mass ratio] | | 23/1 | 9/1 | 5/1 | 9/1 | | 50/1 | | 8/1 |
| | Weight-average molecular weight [$\times 10^3$] | | 356 | 288 | 411 | 288 | | 364 | 1,550 | 301 |
| | Water solubility (*2) | 20° C., 1% (w/v) | – | – | – | – | | – | – | – |
| | | Boiling water, 0.1% (w/v) | ++ | ++ | ++ | ++ | | ++ | ++ | ++ |
| | Addition amount [part by mass, external ratio] | | 0.85 | 0.85 | 0.85 | 0.4 | 0.08 | 0.85 | 0.42 | 0.85 |
| Evaluation result | Compatibility | | ++ | ++ | ++ | ++ | ++ | ++ | ++ | ++ |
| | Transparency | | ++ | ++ | ++ | ++ | ++ | ++ | ++ | ++ |
| | Shape | | ++ | ++ | ++ | ++ | ++ | ++ | ++ | ++ |
| | Wettability (BUT [seconds]) | | +++ (30<) | +++ (30<) | +++ (30<) | +++ (30<) | ++ (20) | +++ (30<) | +++ (30) | +++ (30<) |
| | Lubricity (score [points]) | | +++ (9) | +++ (9) | +++ (8) | +++ (9) | ++ (7) | +++ (8) | +++ (8) | ++ (7) |

TABLE 3-continued

| | | | Example | | | |
|---|---|---|---|---|---|---|
| | | | 2-1 | 2-2 | 2-3 | 2-4 |
| | Common composition | | Heat 1 | | Heat 2 | Heat 3 |
| | Curing method | | Thermal curing | | | |
| Copolymer of the present invention | Copolymer | | 2-1 | 2-2 | 2-1 | |
| | Constituent monomer (*1) | Monomer "a" | MPC | MPC | MPC | |
| | | Monomer "b" | TRIS | PDMSMA | TRIS | |
| | | Monomer "c" | GMA | GMA | GMA | |
| | | Monomer "d" | – | | | |
| | Monomer "a"/monomer "b" [mass ratio] | | 10/1 | 47/1 | 10/1 | |
| | Weight-average molecular weight [×$10^3$] | | 72 | 150 | 72 | |
| | Water solubility (*2) | 20° C., 1% (w/v) | – | – | – | |
| | | Boiling water, 0.1% (w/v) | ++ | ++ | ++ | |
| | Addition amount [part by mass, external ratio] | | 0.85 | | | |
| Evaluation result | Compatibility | | ++ | ++ | ++ | ++ |
| | Transparency | | ++ | ++ | ++ | ++ |
| | Shape | | ++ | ++ | ++ | ++ |
| | Wettability (BUT [seconds]) | | +++ (30) | +++ (30) | ++ (10) | +++ (30<) |
| | Lubricity (score [points]) | | ++ (6) | ++ (7) | ++ (6) | ++ (5) |

| | | | Example | | | | | | | | |
|---|---|---|---|---|---|---|---|---|---|---|---|
| | | | 3-1 | 3-2 | 3-3 | 3-4 | 3-5 | 3-6 | 3-7 | 3-8 | 3-9 |
| | Common composition | | Light 1 | | | | | | | | Light 2 |
| | Curing method | | Photocuring (365 nm) | | | | | | | | Photocuring (405 nm) |
| Copolymer of the present invention | Copolymer | | 3-1 | | | 3-2 | 3-3 | 3-4 | 3-5 | 3-6 | 3-2 |
| | Constituent monomer (*1) | Monomer "a" | MPC | | | | MPC | | MPC | MPC | MPC |
| | | Monomer "b" | TRIS | | | | PDMSMA | | ETS | SiGMA | TRIS |
| | | Monomer "c" | MBP | | | | MBP | | AzSt | MBP | MBP |
| | | Monomer "d" | – | | | | – | | – | – | – |
| | Monomer "a"/monomer "b" [mass ratio] | | 10/1 | | | 5/1 | 45/1 | 45/1 | 10/1 | 10/1 | 5/1 |
| | Weight-average molecular weight [×$10^3$] | | 72 | | | 21 | 105 | 951 | 70 | 74 | 21 |
| | Water solubility (*2) | 20° C., 1% (w/v) | – | | | – | – | – | – | – | – |
| | | Boiling water, 0.1% (w/v) | ++ | | | ++ | ++ | ++ | ++ | ++ | ++ |
| | Addition amount [part by mass, external ratio] | | 0.08 | 0.4 | 0.77 | 0.77 | 0.77 | 0.77 | 0.77 | 0.77 | 0.78 |
| Evaluation result | Compatibility | | ++ | ++ | ++ | ++ | ++ | ++ | ++ | ++ | ++ |
| | Transparency | | ++ | ++ | ++ | ++ | ++ | ++ | ++ | ++ | ++ |
| | Shape | | ++ | ++ | ++ | ++ | ++ | ++ | ++ | ++ | ++ |
| | Wettability (BUT [seconds]) | | ++ (10) | ++ (10) | +++ (30<) | +++ (30<) | +++ (30) | +++ (30) | +++ (30<) | +++ (30) | +++ (30) |
| | Lubricity (score [points]) | | ++ (7) | ++ (6) | ++ (6) | ++ (5) | ++ (5) | ++ (7) | ++ (5) | ++ (7) | ++ (5) |

*1MPC: 2-methacryloyloxyethyl phosphorylcholine

TRIS: tris(trimethylsiloxy)silylpropyl methacrylate

PDMSMA: polydimethylsiloxane monomethacrylate

ETS: 4-(2-hydroxyethyl)-2-methylene-1-(tris(trimethylsiloxy)silylpropyl)butane-1,4-dioate HEAA: hydroxyethylacrylamide GMA: glycidyl methacrylate MBP: 4-methacryloyloxybenzophenone AzSt: (azidobenzoyloxymethyl)vinylbenzene SiGMA: 3-(3-(methylbis(trimethylsiloxy)silyl)propyl)glycerol-1-methacrylate

*2Under each of the conditions of 1% (w/v) at 20° C. and 0.1% (w/v) in boiling water, a case in which water solubility was found was marked with Symbol "++", and a case in which water solubility was not found was marked with Symbol "–".

Comparative Examples 1-1 to 2-3

As a control test not using the copolymer of the present invention, 7 kinds of silicone hydrogels shown in Table 4 were prepared by the same methods as in Examples, and evaluated by the same methods as in Examples.

TABLE 4

| | | | Comparative Example | | | | | | |
|---|---|---|---|---|---|---|---|---|---|
| | | | 1-1 | 1-2 | 1-3 | 1-4 | 2-1 | 2-2 | 2-3 |
| | Common composition | | Heat 1 | | Heat 2 | Heat 3 | Light 1 | | Light 2 |
| | Curing method | | Thermal curing | | | | Photocuring (365 nm) | | Photocuring (405 nm) |
| Copolymer of the present invention | Copolymer | | | | | – | | | |
| | Constituent monomer | Monomer "a" | | | | – | | | |
| | | Monomer "b" | | | | – | | | |
| | | Monomer "c" | | | | – | | | |
| | | Monomer "d" | | | | – | | | |
| | Monomer "a"/monomer "b" [mass ratio] | | | | | – | | | |
| | Weight-average molecular weight [$\times 10^3$] | | | | | – | | | |
| | Addition amount [part by mass, external ratio] | | | | | – | | | |
| Other component | Component name | | – | MPC | | – | | MPC | – |
| | Addition amount [part by mass, external ratio] | | – | 0.85 | | – | | 0.77 | – |
| Evaluation result | Compatibility | | ++ | ++ | ++ | ++ | ++ | ++ | ++ |
| | Transparency | | ++ | ++ | ++ | + | ++ | ++ | ++ |
| | Shape | | ++ | ++ | ++ | + | ++ | ++ | ++ |
| | Wettability (BUT [seconds]) | | × (<1) | + (5) | × (1) | +++ (30) | × (<1) | × (4) | × (<1) |
| | Lubricity (score [point(s)]) | | × (2) | ++ (5) | × (2) | × (2) | × (2) | + (4) | × (1) |

MPC: 2-methacryloyloxyethyl phosphorylcholine

As apparent from the results of Table 3 and Table 4, the silicone hydrogels of Examples 1-1 to 3-9 each had compatibility, transparency, and a shape that were excellent, and each showed high wettability and lubricity simultaneously, whereas in each of Comparative Examples 1-1 to 2-3, any one or both of the wettability and the lubricity were low because the copolymer of the present invention was not incorporated. In each of Comparative Examples 1-2 and 2-2, MPC was blended as a monomer in place of the copolymer of the present invention, but both of the wettability and the lubricity were low.

It is apparent from Examples and Comparative Examples described above that the use of the modifier for an ophthalmic device of the present invention can suitably improve the wettability and lubricity of a silicone hydrogel.

INDUSTRIAL APPLICABILITY

The silicone hydrogel obtained by curing the silicone hydrogel composition containing the modifier for an ophthalmic device of the present invention can be used to provide an ophthalmic device, such as a contact lens, an intraocular lens, or an artificial cornea.

The invention claimed is:

1. A modifier for an ophthalmic device, comprising a copolymer containing:

a constituent unit based on a hydrophilic monomer "a" represented by the following formula (1); and a constituent unit based on a silicone monomer "b" represented by the following formula (2) or the following formula (3):

(1)

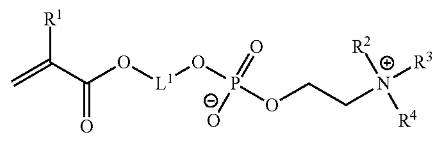

in the formula (1), $R^1$ represents a hydrogen atom or a methyl group, $L^1$ represents an organic group having 2 to 6 carbon atoms, and the organic group may optionally contain one ether bond and/or one hydroxy group, and $R^2$ to $R^4$ each independently represent a hydrocarbon group having 1 to 3 carbon atoms;

(2)

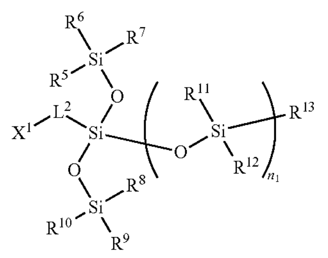

in the formula (2), $X^1$ represents a (meth)acryloyloxy group, a 3-(2-hydroxyethyloxycarbonyl)-2-methylenepropanoyloxy group, a 3-(2-hydroxyethyloxycarbonyl)-3-butenoyloxy group, or a 3-(2-hydroxyethyloxycarbonyl)-2-propenoyloxy group, $L^2$ represents an organic group having 2 to 6 carbon atoms, and the organic group may optionally contain one ether bond and/or one hydroxy group, $R^5$ to $R^{13}$ each independently represent a methyl group or an ethyl group, and $n_1$ represents 0 or 1;

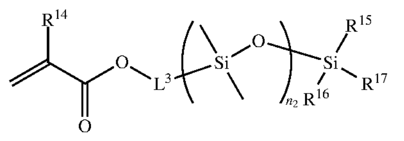

(3)

in the formula (3), $R^{14}$ represents a hydrogen atom or a methyl group, $L^3$ represents an organic group having 2 to 6 carbon atoms, and the organic group may optionally contain one ether bond and/or one hydroxy group, $n_2$ represents an integer of from 4 to 20, and $R^{15}$ to $R^{17}$ each independently represent an alkyl group having 1 to 8 carbon atoms, wherein the copolymer is incapable of dissolving at 1.0% (w/v) in water at 20° C. and capable of dissolving at 0.1% (w/v) or more in boiling water, and a water solubility index (WSI) as defined by formula (4) is from 20 to 700, $$WSI \equiv \frac{\text{monomer } a}{\text{monomer } b}[\text{Mass ratio}] \times \frac{1000}{\text{weight-average molecular weight}} \times 10^3. \quad (4)$$

2. The modifier for an ophthalmic device according to claim 1, wherein the copolymer is capable of dissolving at 1.0% (w/v) or more in boiling water.

3. The modifier for an ophthalmic device according to claim 1, wherein the copolymer further contains a constituent unit based on a thermally reactive monomer or a photoreactive monomer "c".

4. The modifier for an ophthalmic device according to claim 3, wherein a combination of the constituent unit based on the hydrophilic monomer "a" represented by the formula (1), the constituent unit based on the silicone monomer "b" represented by the formula (2) or the formula (3), and/or the constituent unit based on the reactive monomer or the photoreactive monomer "c" is any one selected from the following:

1) 2-methacryloyloxyethyl phosphorylcholine and tris(trimethylsiloxy)silylpropyl methacrylate;

2) 2-methacryloyloxyethyl phosphorylcholine and polydimethylsiloxane monomethacrylate;

3) 2-methacryloyloxyethyl phosphorylcholine and 4-(2-hydroxyethyl)-2-methylene-1-(tris(trimethylsiloxy)silylpropyl)butane-1,4-dioate;

4) 2-methacryloyloxyethyl phosphorylcholine, tris(trimethylsiloxy)silylpropyl methacrylate, and glycidyl methacrylate;

5) 2-methacryloyloxyethyl phosphorylcholine, polydimethylsiloxane monomethacrylate, and glycidyl methacrylate;

6) 2-methacryloyloxyethyl phosphorylcholine, tris(trimethylsiloxy)silylpropyl methacrylate, and methacryloyloxybenzophenone;

7) 2-methacryloyloxyethyl phosphorylcholine, polydimethylsiloxane monomethacrylate, and methacryloyloxybenzophenone;

8) 2-methacryloyloxyethyl phosphorylcholine, 4-(2-hydroxyethyl)-2-methylene-1-(tris(trimethylsiloxy)silylpropyl)butane-1,4-dioate, and 4-(4-azidobenzoyloxymethyl)vinylbenzene; and 9) 2-methacryloyloxyethyl phosphorylcholine, 3-(3-(methylbis(trimethylsiloxy)silyl)propyl)glycerol-1-methacrylate, and methacryloyloxybenzophenone.

5. A silicone hydrogel composition, comprising:

the copolymer of claim 3; and a base composition, wherein a content of the copolymer is from 0.05 part by mass to 2 parts by mass with respect to 100 parts by mass of the base composition.

6. A silicone hydrogel, which is obtained by curing the silicone hydrogel composition of claim 5.

7. An ophthalmic device, comprising the silicone hydrogel of claim 6.

8. The ophthalmic device according to claim 7, wherein the ophthalmic device is a soft contact lens.

9. A silicone hydrogel composition, comprising:

the copolymer of claim 1; and a base composition, wherein a content of the copolymer is from 0.05 part by mass to 2 parts by mass with respect to 100 parts by mass of the base composition.

10. A silicone hydrogel, which is obtained by curing the silicone hydrogel composition of claim 9.

11. An ophthalmic device, comprising the silicone hydrogel of claim 10.

12. The ophthalmic device according to claim 11, wherein the ophthalmic device is a soft contact lens.

13. A modifier for an ophthalmic device, comprising a copolymer containing:

a constituent unit based on a hydrophilic monomer "a"; and a constituent unit based on a silicone monomer "b"; and a constituent unit based on a thermally reactive monomer or a photoreactive monomer "c", wherein the constituent unit based on the hydrophilic monomer "a" is 2-methacryloyloxyethyl phosphorylcholine, the constituent unit based on the silicone monomer "b" is tris(trimethylsiloxy)silylpropyl methacrylate, polydimethylsiloxane monomethacrylate, 4-(2-hydroxyethyl)-2-methylene-1-(tris(trimethylsiloxy)silylpropyl)butane-1,4-dioate, or 3-(3-(methylbis(trimethylsiloxy)silyl)propyl)glycerol-1-methacrylate, and the constituent unit based on the thermally reactive monomer or the photoreactive monomer "c" is glycidyl methacrylate, methacryloyloxybenzophenone, or 4-(4-azidobenzoyloxymethyl)vinylbenzene, wherein the copolymer is incapable of dissolving at 1.0% (w/v) in water at 20° C. and capable of dissolving at 0.1% (w/v) or more in boiling water, and a water solubility index (WSI) as defined by formula (4) is from 20 to 700, $$WSI \equiv \frac{\text{monomer } a}{\text{monomer } b}[\text{Mass ratio}] \times \frac{1000}{\text{weight-average molecular weight}} \times 10^3. \quad (4)$$

14. A silicone hydrogel composition, comprising:

the copolymer of claim 13; and a base composition, wherein a content of the copolymer is from 0.05 part by mass to 2 parts by mass with respect to 100 parts by mass of the base composition.

15. A silicone hydrogel, which is obtained by curing the silicone hydrogel composition of claim 14.

16. An ophthalmic device, comprising the silicone hydrogel of claim 15.

17. The ophthalmic device according to claim 16, wherein the ophthalmic device is a soft contact lens.

* * * * *